March 21, 1939.   L. B. BACON   2,151,579
INDICATING DEVICE FOR INDICATING THE LEVEL OF LIQUID IN CONTAINERS
Filed Aug. 15, 1936   3 Sheets-Sheet 1
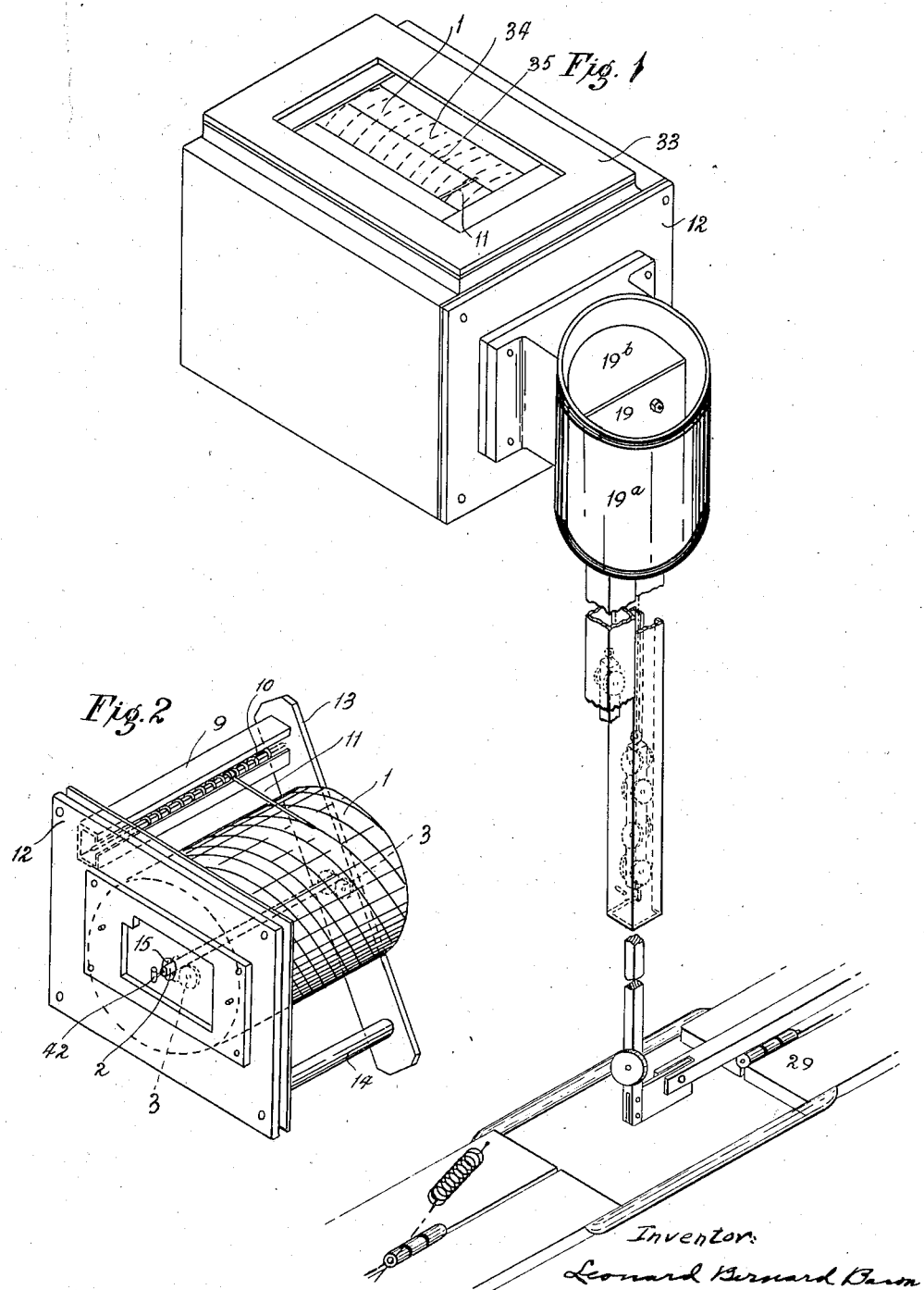

March 21, 1939.　　　L. B. BACON　　　2,151,579
INDICATING DEVICE FOR INDICATING THE LEVEL OF LIQUID IN CONTAINERS
Filed Aug. 15, 1936　　　3 Sheets-Sheet 2
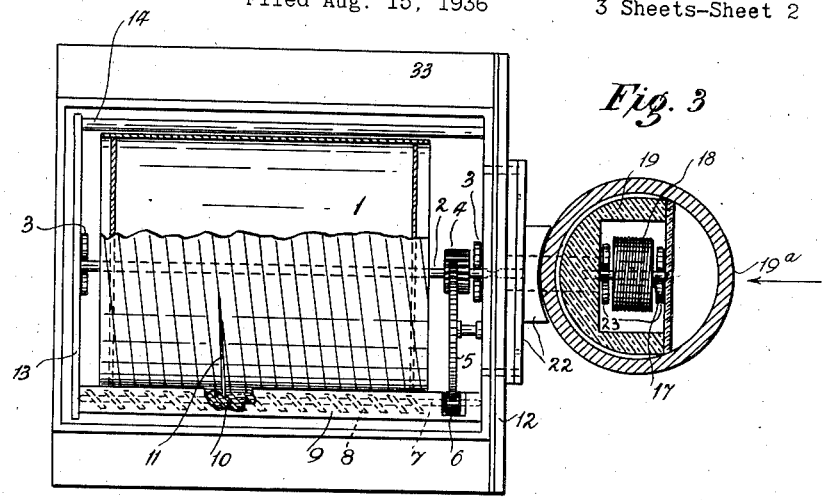
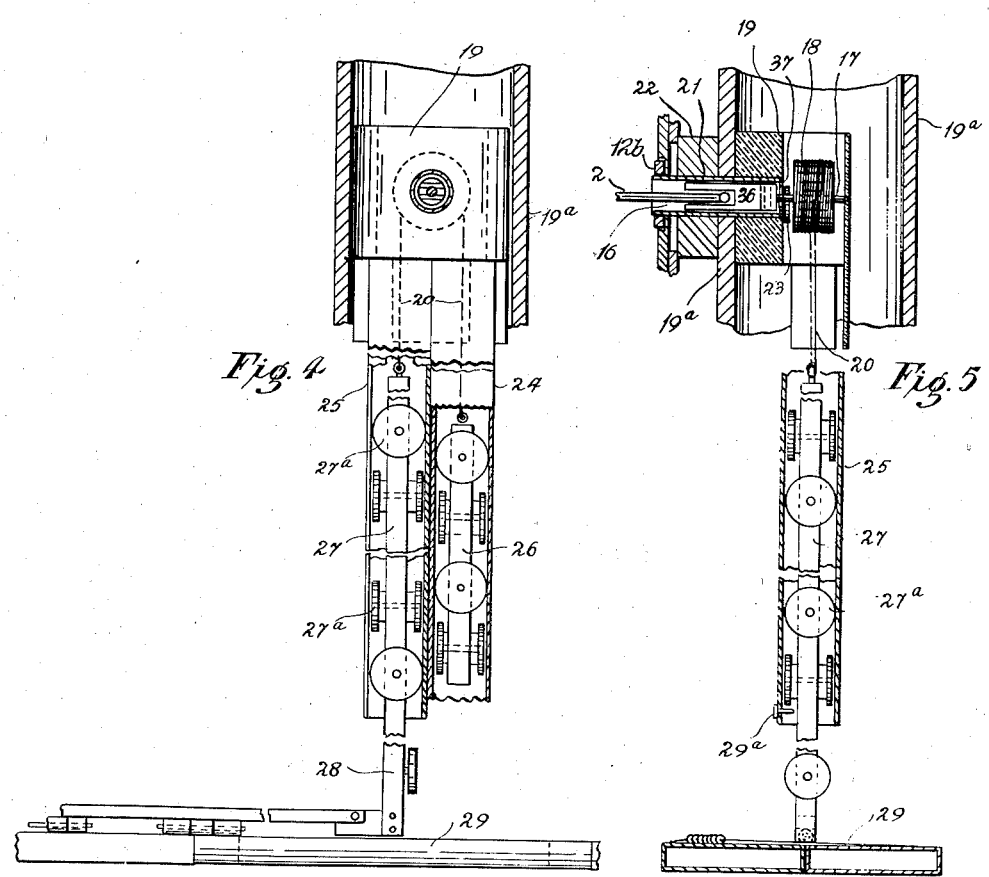

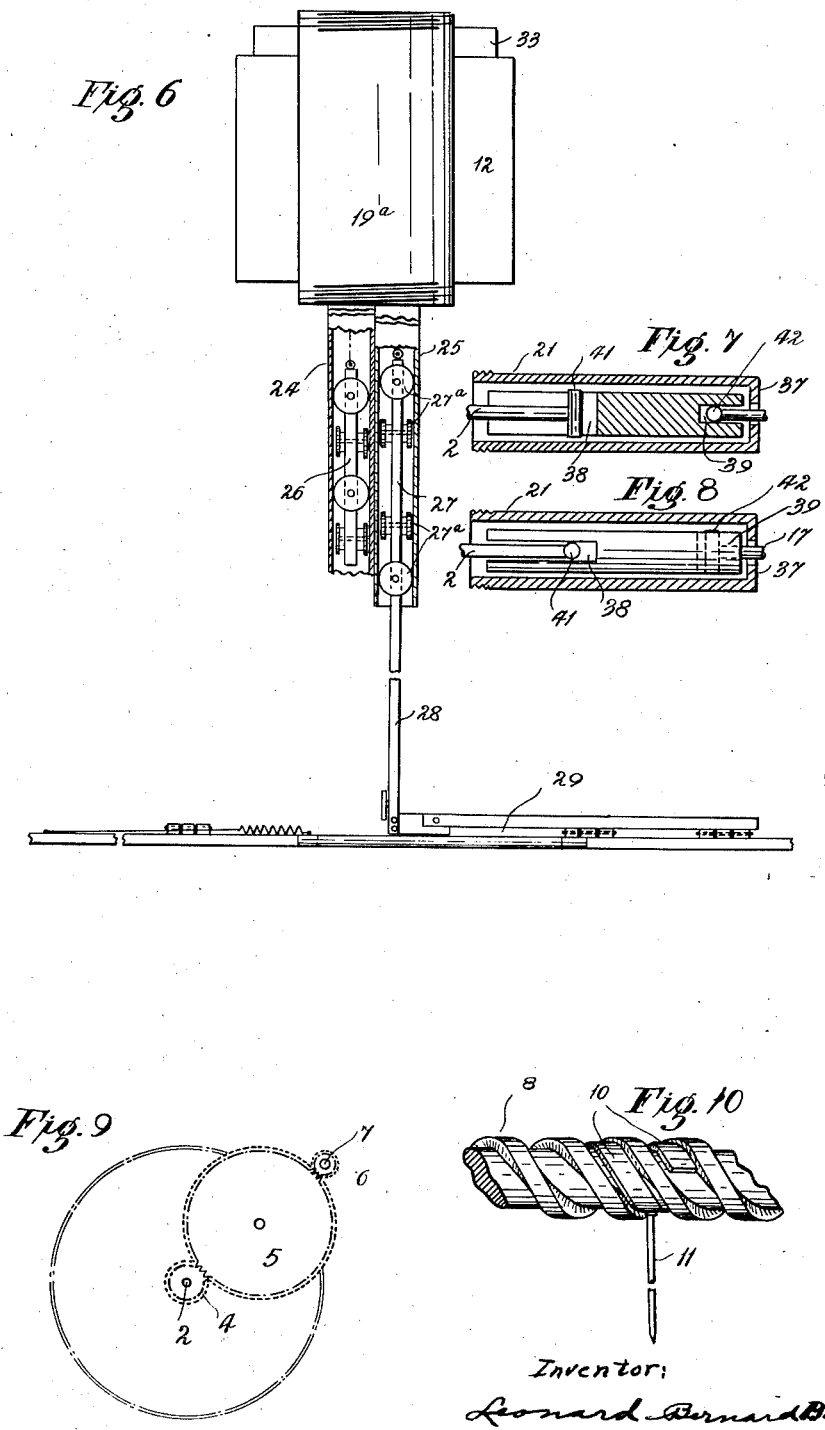

Patented Mar. 21, 1939

2,151,579

UNITED STATES PATENT OFFICE 2,151,579

INDICATING DEVICE FOR INDICATING THE LEVEL OF LIQUID IN CONTAINERS

Leonard Bernard Bacon, East Brunswick, Victoria, Australia

Application August 15, 1936, Serial No. 96,297
In Australia August 26, 1935

1 Claim. (Cl. 116—129)

This invention relates to improvements in and relating to an indicating device for indicating the level of liquid in a container and has for its object to provide a cheap, efficient and simple device for the purpose of recording accurately the quantity of liquid remaining in or removed from a liquid container at any given time.

A further object of the invention is to considerably decrease the friction error experienced in gauges used for this purpose.

Broadly the invention is comprised of a rotary member mounted on roller bearings which is actuated to rotate by the fall or rise of a float on the liquid surface. The invention also includes a rotary indicating drum which is actuated by the rotary member. The longitudinal cylindrical exterior surface of the drum is provided with spirally arranged indicating media thereon, which, in association with index means movable longitudinally and exteriorly of the drum surface, provide visible readings of the liquid level in the tank. I move the index means longitudinally of the drum surface by using a rotary quick pitch screw which is driven from the rotary member through a simple chain of gears.

The invention is illustrated in the accompanying drawings in which

Fig. 1 is a perspective view of the indicating means enclosed in casings therefor and of part of a float.

Fig. 2 is a perspective of the spirally calibrated drum and rotary screw adjacent to it.

Fig. 3 is a plan view in part section of the indicating means.

Fig. 4 is a part sectional elevation of means to actuate the rotary member.

Fig. 5 is a sectional elevation of the same parts as in Fig. 4 but from another direction.

Fig. 6 is another view in part section of the means to actuate the rotary member and includes an illustration of a float.

Fig. 7 and Fig. 8 are section views of a universal joint.

Fig. 9 is a diagram of a chain of gears.

Fig. 10 is a broken view of a quick pitch screw and a quick pitch nut with a pointer extending therefrom.

A light hollow cylindrical drum 1 is carried on a shaft 2 supported by wheel bearings 3. On the shaft 2 is a pinion 4 which meshes with an intermediate toothed wheel 5 between it and a pinion 6 formed on the shaft 7 of a quick release screw 8 rotatable in a housing 9 of which one face (that toward the drum 1) is open. A quick pitch nut 10 engages in the thread of the screw 8 and is moved longitudinally by the rotation thereof. From the nut 10 a pointer 11 projects through the open face of the housing 9 above the drum 1 which said housing is fixed between a plate 12 and a flat bar 13 disposed substantially parallel to the diagonal of the said plate 12 and held offset therefrom by the housing 9 and a bolt 14. On the bar 13 and centrally thereof one of the wheel bearings 3 for the shaft 2 is mounted, which shaft 2 projects beyond the plate 12 through an orifice 15 and is jointed through a universal joint 16 to a shaft 17 which carries a threaded pulley 18 housed in a casing 19 situated in a length of piping 19a in such a manner as to allow a rod such as a dip tube to pass through the said piping. The casing 19 has a removable lid 19b to enable access to the pulley 18 if such should be necessary. The casing 19 is held in position by a tube 21 extending rearwardly from the casing 19 through an orifice in the piping 19a or in the dip tube itself if desired, the said piping being open at both ends. The said length of piping 19a is threaded at top and bottom to enable a cap to be screwed on the top if desired and to enable it to be coupled to the dip tube of a tank at the bottom. In Figs. 3, 4 and 5 the reference numeral 19a may apply to a length of piping or to the dip tube of a tank.

The tube 21 also passes through a distance piece 22 affixed to the plate 12 and receives a nut 12b at the rear of the plate 12. The tube 21 houses the universal joint 16 by which the pulley shaft 17 and drum shaft 2 are joined together and made to rotate in unison. Wheel bearings 23 support the shaft 17. From the bottom of the casing 19 extend two tubes or housings 24 and 25 one (24) of which houses a counterweight 26 and the other (25) of which houses a trolley 27 running therein on a set of wheels 27a the weight and the trolley being joined by a wire or rope 20 which is threaded for one or more turns over the pulley 18. From the trolley an arm 28 extends and on the end of this arm is pivotally mounted a float 29 a pin or stop 29a limiting the downward travel of the trolley 27.

The drum 1 is housed in a casing 33 in which is a window 34 which enables the pointer 11 to be seen therethrough. On the window 34 a line 35 is marked and the pointer 11 is in such position that the end thereof is vertically below this line.

To install the device the float 29 is placed in the tank. The wire 20 being turned over the pulley 18 the counterweight 26 depends on the other side. The tube 21 from the pulley housing or casing 19 is passed through a hole in the piping or dip tube 19a through the distance piece 22 and the plate 12 which forms one wall of the housing 33 and the nut 12b is screwed onto a threaded portion of the external periphery of the tube 21.

The universal joint by means of which the drum shaft 2 is jointed to the pulley shaft 17 is comprised of a member 36 disposed loosely inside the tube 21 which said tube is provided with a flange or shoulder 37 at the end opening into the casing 19. The member 36 is bifurcated at both ends, one bifurcation 38 running at right angles to the other bifurcation 39. Movement of the member 36 towards the pulley housing is limited by the flange or shoulder 37.

The shafts 2 and 17 which extend respectively beyond the plate 12 and the internal wall of the casing 19 have cross heads 41 and 42 formed on the ends thereof and these heads fit into the bifurcations 38 and 39 respectively. Thus the rotary movement of one shaft is transferred to the other shaft per media the member 36 rotating in the tube 21.

The apparatus being in position with the float horizontally floating on the liquid any change in the level of that liquid causes the float to rise or fall according to the nature of the change of level. Assuming the change to be a fall of level then the float will fall and carry with it the wire 20 which being threaded on the pulley indirectly causes the rotation of the drum shaft 2 and consequently the revolution of the drum 1 in the manner above described and also, the rotation of the shaft 2 on which the pinion 4 is mounted causes the rotation of the pinion 6 through the intermediate wheel 5. The pinion 6 being carried by the shaft 7 of the quick pitch screw 8 that screw turns and causes the quick pitch nut 10, which carries the pointer 11, to move longitudinally along the thread thereof. Thus the drum 1 revolves and the pointer moves longitudinally over its surface.

Now the drum 1 is calibrated along a spiral line on its surface and the speed of revolution of the drum and the pitch of the screw are such that the pointer follows this line. Naturally the drum must be calibrated for each container in which the apparatus is used but once this calibration is effected the pointer will indicate the measure of the liquid in the said container the reading being the number appearing on the drum beneath the tip of the pointer when that tip is in alignment with the line 35 on the glass window 34 and the eye of the observer.

I claim:

In combination, a support, a rotary indicating drum, a length of piping and a casing removably mounted therein, a rotary drum actuating member mounted in the casing, means for mounting the casing in the piping including a tubular housing secured thereto and extending therefrom through an opening provided in the piping for attachment to said support, and means for releasably operatively associating said rotary drum and said actuating member including shafts extending from said drum and actuating member into said tubular housing, each of said shafts having cross heads mounted on the end thereof disposed at right angles to each other, and a connecting block disposed in said tubular housing between the ends of said shafts having complementary bifurcated ends for receiving said cross heads therein whereby rotary motion is imparted to said rotary indicating drum.

LEONARD BERNARD BACON.